US005459987A

United States Patent [19]
Hining et al.

[11] Patent Number: 5,459,987
[45] Date of Patent: Oct. 24, 1995

[54] INTEGRATED MAIN FRAME AND BASKET SUSPENSION FOR A SIDE-DELIVERY RAKE

[75] Inventors: Larry D. Hining, Ottumwa; Dale R. Dolberg, Hedrick; James L. Vogt, Ottumwa, all of Iowa

[73] Assignee: Deere & Company, Moline, Ill.

[21] Appl. No.: 283,935

[22] Filed: Aug. 1, 1994

[51] Int. Cl.⁶ ................................................. A01D 78/14
[52] U.S. Cl. ............................ 56/366; 56/377; 56/396
[58] Field of Search ........................... 56/366, 376, 377, 56/380, 384, 396

[56] References Cited

U.S. PATENT DOCUMENTS

| | | | |
|---|---|---|---|
| 2,370,355 | 2/1945 | Jones | 56/376 |
| 2,491,211 | 12/1949 | Rietz | 56/377 |
| 2,672,005 | 5/1951 | Hamilton | 56/377 |
| 2,763,120 | 9/1956 | Johnson | 56/377 |
| 2,781,626 | 2/1957 | Happe et al. | 56/377 |
| 2,991,613 | 2/1959 | Breed | 56/377 |
| 3,321,895 | 5/1967 | Morkoski | 56/377 |
| 3,406,509 | 10/1968 | Wood | 56/377 |
| 3,527,041 | 9/1970 | Yeske | 56/377 |

*Primary Examiner*—George A. Suchfield

[57] ABSTRACT

A side-delivery rake includes a main frame comprising right- and left-hand frame members which diverge rearwardly and are interconnected at their forward ends by a front support assembly and are further interconnected by front, intermediate and rear braces. The intermediate brace is constructed of a cylindrical tubular member and is bent to include opposite end sections that are respectively disposed at right angles to the right- and left-hand main frame members. Identical bell cranks are mounted for rocking about opposite ends of the intermediate brace and include first arms respectively connected, by suspension chains, to identical upstanding brackets fixed to a rake reel support basket extending beneath the main frame, and second arms respectively connected to right- and left-hand lift cranks.

9 Claims, 4 Drawing Sheets

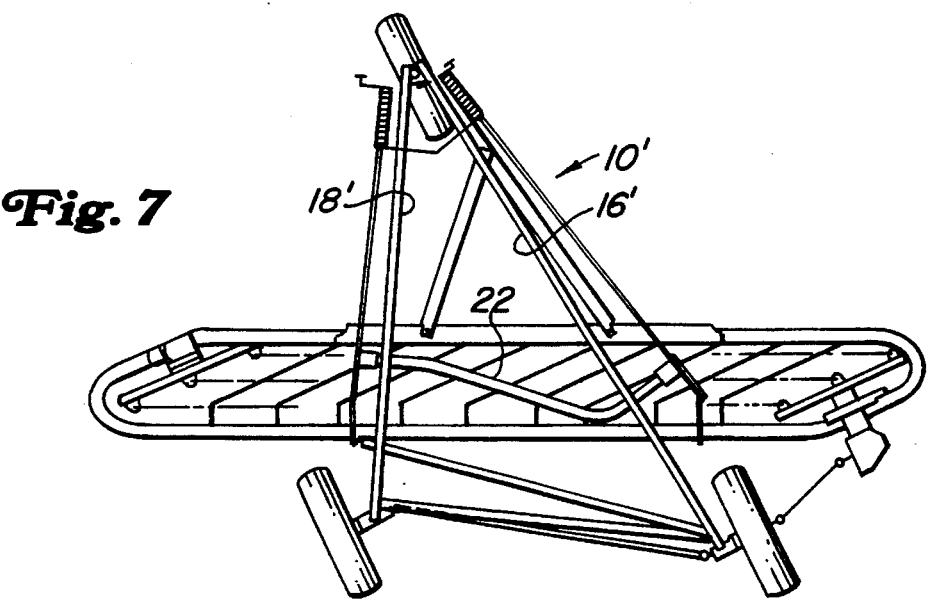
Fig. 7
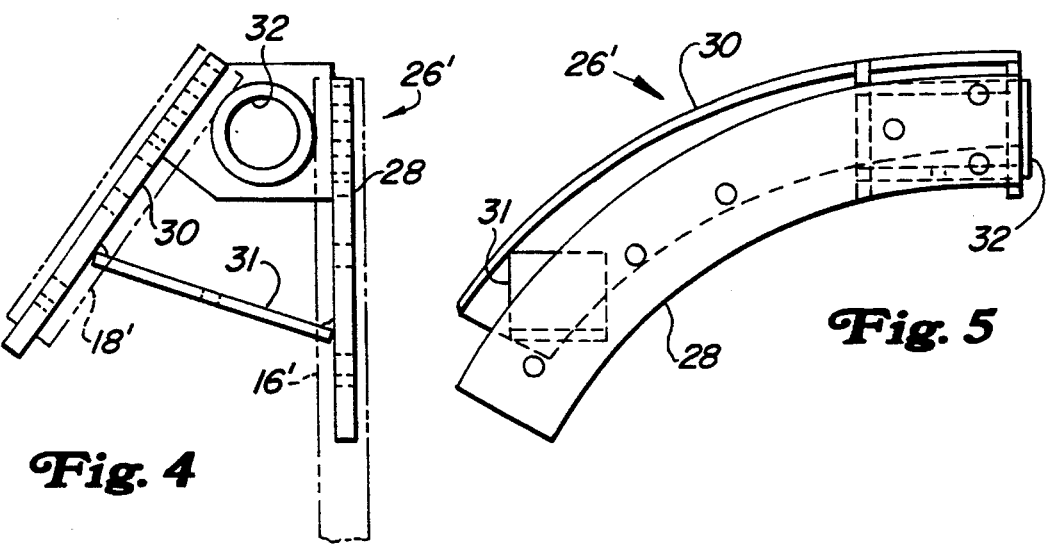
Fig. 4
Fig. 5
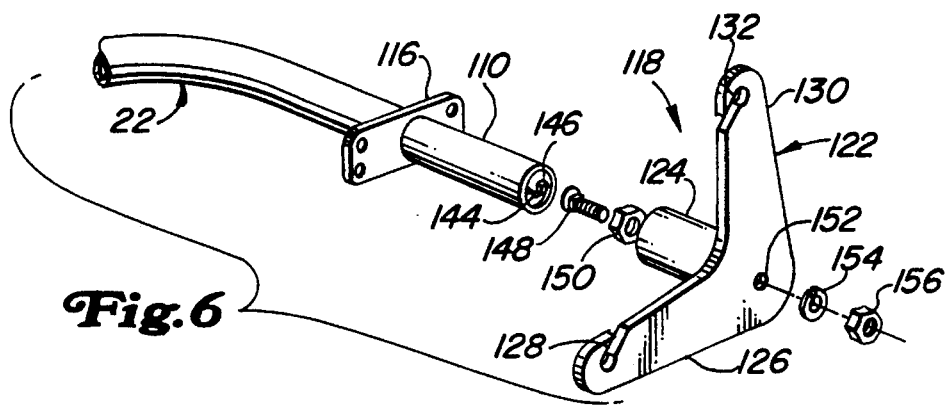
Fig. 6

5,459,987

1

INTEGRATED MAIN FRAME AND BASKET SUSPENSION FOR A SIDE-DELIVERY RAKE

BACKGROUND OF THE INVENTION

The present invention relates to side delivery rakes and more specifically relates to frames and basket suspensions for such rakes.

A typical side-delivery rake includes a substantially V-shaped main frame assembly comprising a pair of rearwardly diverging channel members which, as viewed from the side, are arched between their front and rear ends. The forward ends of the channel members are joined together by a tongue or towing structure and the respective rear ends are supported by a pair of rear wheels mounted to axle assemblies carried by the channel members. The frame assembly further includes at least front, intermediate and rear tie bars or braces extending between and having end flanges respectively bolted to the pair of channel members. A subframe assembly includes a reel frame or basket supporting a reel, comprising a plurality of tooth bars carrying spring teeth, for rotation about a central axis. The basket is located beneath the arched portion of the main frame and, depending upon whether the main frame is designed for right- or left-hand raking operation is respectively angled relative to the direction of travel so as to have either a trailing right-hand end or a trailing left-hand end. The subframe assembly is suspended from the main frame at three points. Specifically, one type of suspension includes separate right- and left-hand bell cranks respectively pivotally connected to the right- and left-hand channel members of the main frame and having first arms coupled by right- and left-hand suspension links to right- and left-hand locations spaced along the basket. Linked to respective second arms of the right- and left-hand bell cranks are separate right- and left-hand reel height adjustment or leveling cranks. A second type of suspension includes a rockshaft rotatably mounted in the right- and left-hand channel members with right- and left-hand suspension arms being integral with the rockshaft and coupled to the right- and left-hand locations of the basket by the right- and left-hand suspension links. A tooth pitch adjusting mechanism is coupled between the main frame and a third location of the subframe assembly and is operable for raising or lowering the subframe assembly so as to effect changes in the pitch or "angle of attack" of the rake teeth.

Typical side-delivery rakes, structured as described above, are disclosed in U.S. Pat. No. 2,672,005 granted to Hamilton on Mar. 16, 1954; U.S. Pat. No. 2,991,613 granted to Breed on Jul. 11, 1961; and U.S. Pat. No. 3,321,895 granted to Morkoski on May 30, 1967. One common deficiency of these rake structures is that there is little or no integration of the main frame and suspension structures nor do these structures include parts which are adaptable for use with right- or left-hand rake versions nor for rakes of different sizes. This results in the rakes having more parts than are necessary and thus in being more costly to manufacture.

SUMMARY OF THE INVENTION

According to the present invention, there is provided an improved rake structure and, more specifically, there is provided an integrated main frame and basket suspension for a side-delivery rake.

An object of the invention is to provide a side-delivery rake having an integrated main frame and basket suspension utilizing fewer parts than previous side-delivery rakes.

2

A more specific object of the invention is to provide a side-delivery rake main frame with a tie bar or brace having opposite ends defining pivot mountings for the bell cranks of the basket suspension leveling or height adjustment system.

Yet another specific object of the invention is to provide a side-delivery rake main frame, as set forth in the immediately preceding object, wherein the tie bar or brace is useable with either a right-hand or a left-hand version of the rake.

Still another specific object of the invention is to provide a side-delivery rake basket leveling or height adjustment system including a pair of identical bell cranks which are useable with both right- and left-hand versions of the side-delivery rake.

These and other objects of the invention will become apparent from a reading of the ensuing description together with the appended drawings.

BRIEF DESCRIPTION OF THE DRAWINGS

FIG. 4 is a top plan view of the front wheel support assembly for a left-hand side-delivery rake.

FIG. 5 is a right side elevational view of the front wheel support assembly shown in FIG. 4.

FIG. 6 is a perspective, exploded view of the right-hand end portion of the main frame intermediate brace and the lift structure bell crank attached thereto.

FIG. 7 is a top plan view of a right-hand side-delivery rake.

DESCRIPTION OF THE PREFERRED EMBODIMENT

Figure 1:
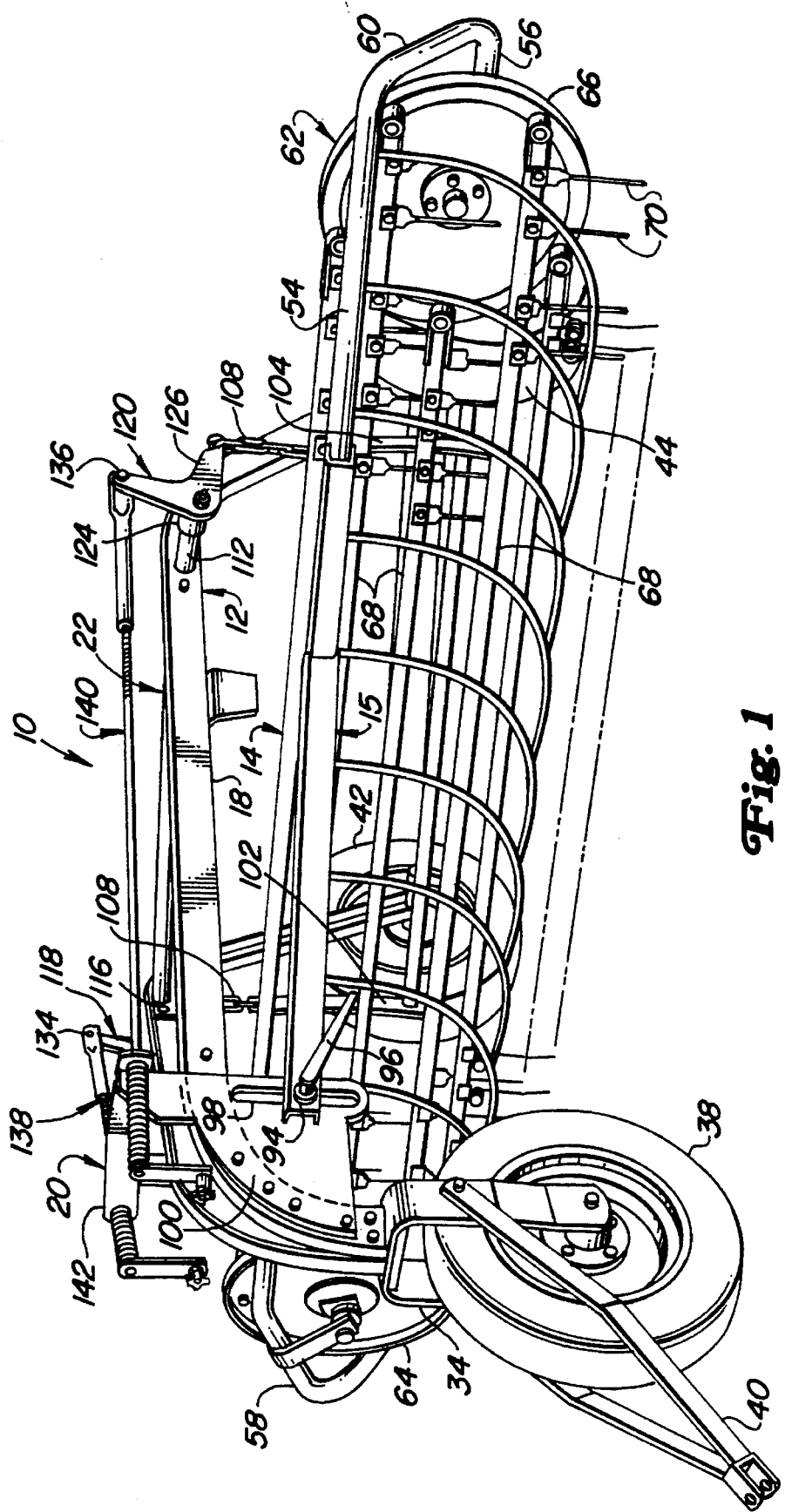
FIG. 1 is a left front perspective view of a left-hand side-delivery rake embodying the present invention.
Figure 2:
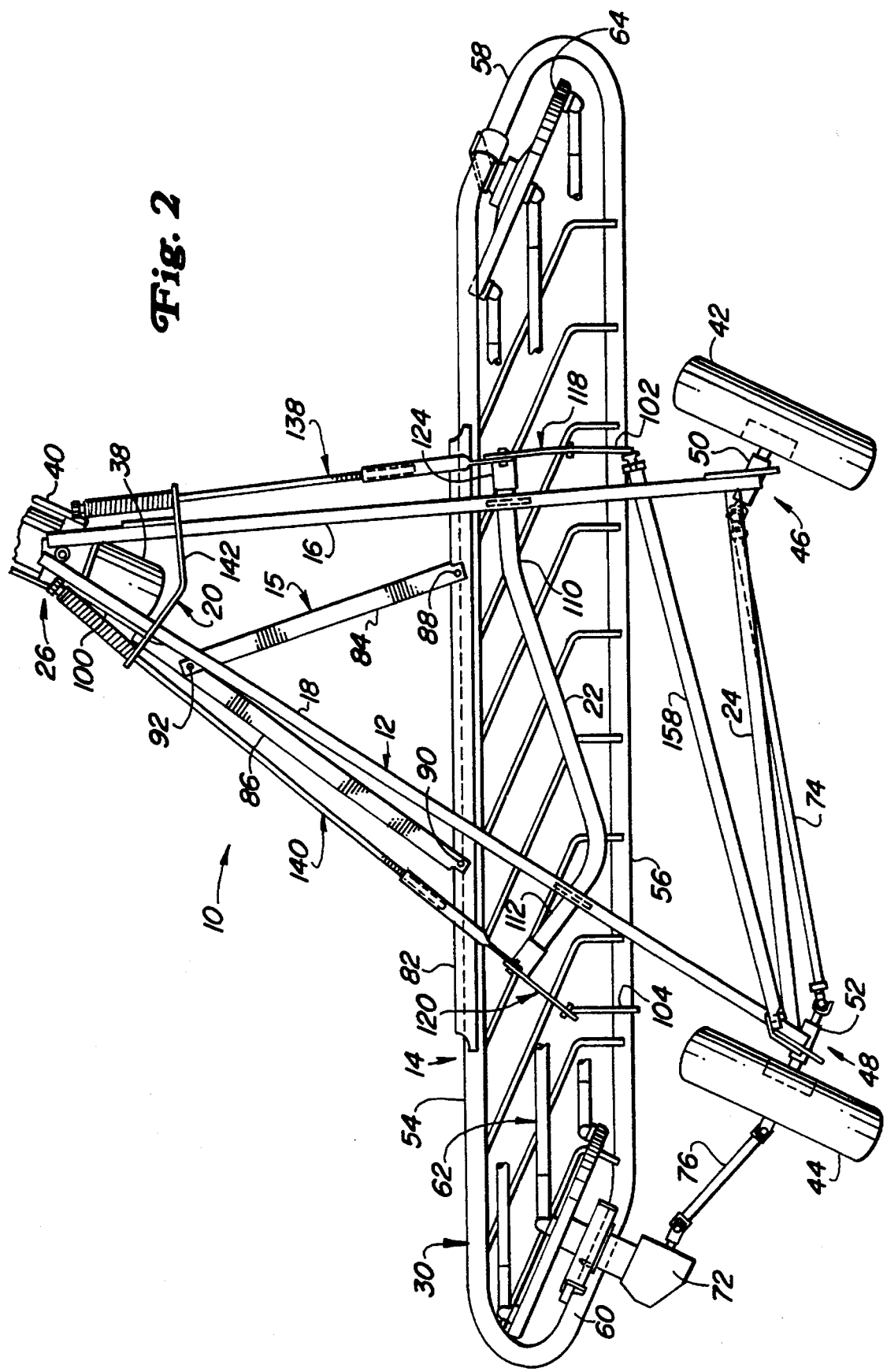
FIG. 2 is a top plan view of the side-delivery rake shown in FIG. 2.
Figure 3:
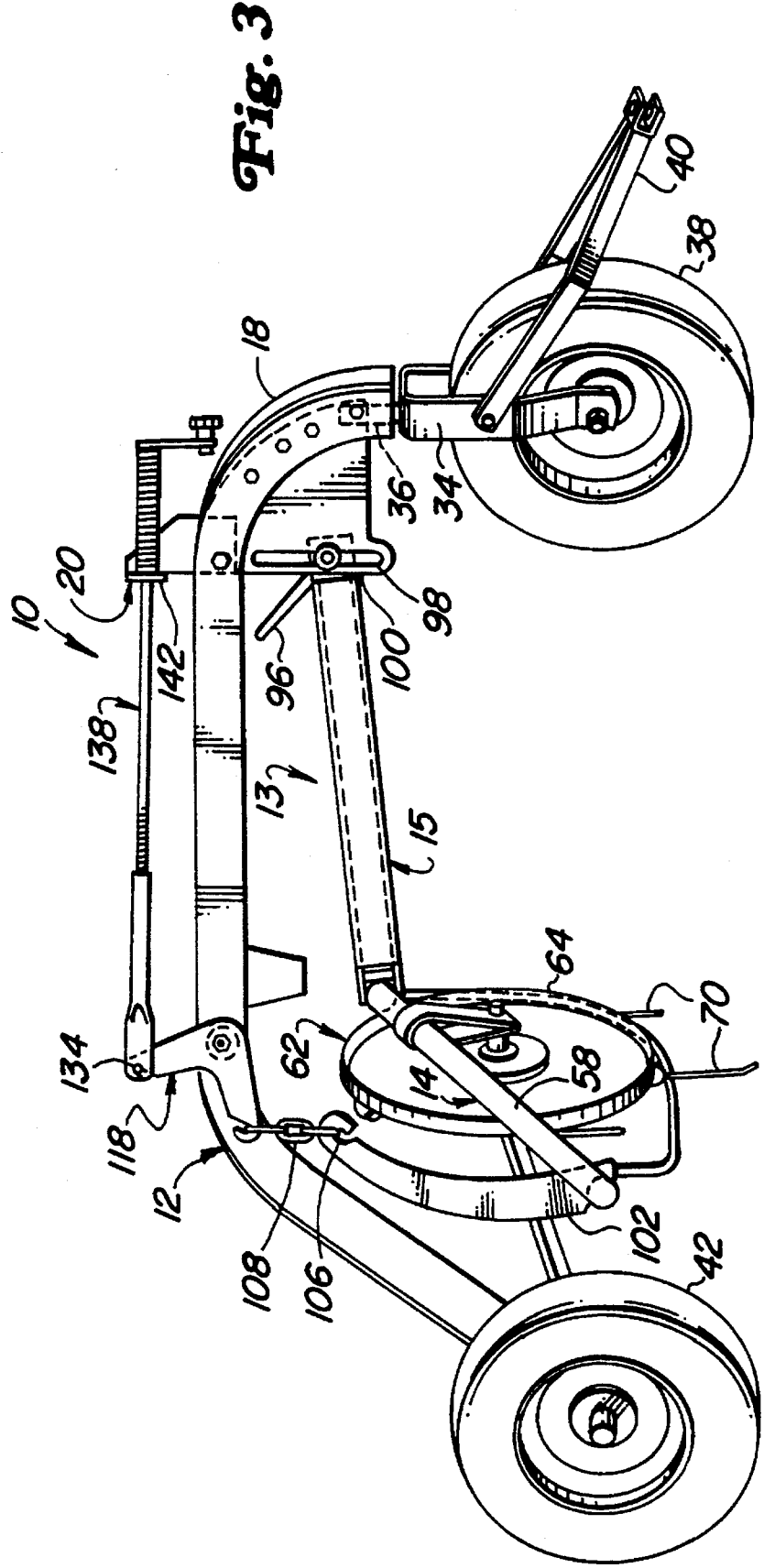
FIG. 3 is a right side elevational view of the side-delivery rake shown in FIG. 2.

Referring now to FIGS. 1–3, there is shown a ground-driven, left-hand side-delivery rake 10 including a main frame 12 from which is suspended a subframe 13 including a reel frame or basket 14 and a suspension frame 15.

The main frame 12 includes right- and left-hand channel members 16 and 18 which diverge rearwardly and, as viewed from the side, each includes a horizontal intermediate section joined to an arcuate, downwardly curved front section and to a downwardly and rearwardly extending rear section. Thus, the main frame 12 is arched between its front and rear ends. Extending between and joining the members 16 and 18 are front, intermediate and rear tie bars or braces 20, 22 and 24, respectively. A wheel support assembly, the details of which are not shown in FIGS. 1–3, is mounted to the curved forward ends of the frame members 16 and 18. The components used in the structure of the wheel support assembly are shown (FIGS. 4 and 5) assembled for use with a wheel support assembly 26' configured for use with a right-hand rake 10' (FIG. 7), this configuration being a mirror image of that used with the left-hand rake 10. Specifically, the assembly 26' includes identical arcuate side plates 28 and 30 respectively received within and bolted to frame members 16' and 18'. Welded between upper locations of the plates 28 and 30, as considered when assembled in a rake, is a vertical gusset plate 31 and welded between lower locations of the plates 28 and 30 is a weldment including a vertical cylindrical tubular receptacle 32. A wheel yoke 34 includes a vertical spindle 36 swivelly received in the receptacle 32 and mounted to depending legs of the yoke 34 is a front gauge or support wheel 38. A V-shaped hitch 40 has opposite legs pivotally attached to opposite legs of the yoke 34. It is here noted that, if it is desired to support the forward end of the rake 10 directly on the drawbar of a tractor, a vertical tubular hitch post having a cross section shaped like the weldment supporting the receptacle 32 would replace the receptacle weldment, with the hitch post having a clevis fixed to its lower end.

The main frame 12 is further supported by right- and left-hand support wheels 42 and 44 respectively mounted to axle flanges forming part of right- and left-hand axle assemblies 46 and 48 including shafts rotatably mounted in bearing housings 50 and 52 respectively coupled to lower rear locations of the main frame channel members 16 and 18.

The reel frame or basket 14 extends diagonally to the line of draft of the rake 10 such that the right-hand end of the basket leads the left-hand to thus establish a left-hand rake. The basket 14 comprises a cylindrical tubular frame that, as viewed from the top in FIG. 2, is generally in the shape of a parallelogram. A front side 54 of the basket frame 14 is located higher than a rear side 56 of the frame and is joined thereto by right- and left-hand ends 58 and 60. A rake reel 62 includes right-and left-hand reel disks 64 and 66 respectively rotatably mounted to the right- and left-hand frame ends 58 and 60. Opposite ends of a plurality of tine bars 68 are respectively universally connected to the disks 64 and 66 and each tine bar 68 carries a plurality of rake teeth 70 spaced along its length. The rake reel 62 is here shown as being ground driven and for this purpose a right-angle gear box 72 is mounted to the left-hand frame end 60 and has its output shaft coupled to a shaft that is integral with the reel disk 66. Inwardly projecting ends of the shafts of the axle assemblies 46 and 48 are interconnected by a first drive shaft section 74 while an outwardly projecting shaft of the left-hand axle assembly 48 is coupled to the input shaft of the gear box 72 by a second drive shaft section 76. The present invention could just as well be applied to a rake having a hydraulically driven reel. In such rake, a hydraulic motor would replace the gear box 72 and the drive shaft sections 74 and 76 would be omitted.

The suspension frame 15 comprises a rearwardly opening rear channel member 82 having a central portion of the front side 54 of the basket frame 30 located therein and welded to the legs thereof. The suspension frame 15 further comprises right- and left-hand channel members 84 and 86 having their respective rear ends pinned, as at 88 and 90 to transversely spaced locations of the rear channel member 82. The channel members 84 and 86 converge forwardly with the members being pinned together, as at 92, at a location rearwardly of the forward end of the left-hand member 86. The left-hand member 86 is oriented substantially in the direction of travel of the rake and carries a ball joint 94 (FIG. 1) at its forward end which is releasably fixed, as by a clamping device 96, in a desired point of adjustment within a vertical slot 98 provided in an adjustment plate 100 fixed to the left-hand channel member 18 of the main frame 12. Right- and left-hand, identical, upright hanger brackets 102 and 104 have their respective lower ends welded to the rear side 58 of the basket 14 at laterally spaced locations. As can best be seen in FIG. 3, the brackets 102 and 104 are curved in parallel relationship to the path of motion of the tine bars 70 and each has a downwardly opening hook 106 formed in its upper end for receiving a lower link of a suspension chain 108 that has been slipped over the upper end of the hanger bracket. As can best be seen in FIG. 2, the tie bar or cross brace 22 is bent so as to have right-and left-hand end sections 110 and 112, respectively, disposed at right angles to the frame members 16 and 18, the latter being provided with openings through which the end sections project outwardly, and the brace end sections 110 and 112 being provided with a flanges 116 and 117 (FIGS. 1 and 6), respectively, bolted to the channel members 16 and 18. It is here noted that the brace 22 is used in the right-hand rake 10' shown in FIG. 7, and it will be appreciated that the bends in the ends of the brace 22 makes this use possible. Identical, right- and left-hand bell cranks or lift arms 118 and 120, respectively, are pivotally mounted on the opposite ends of the brace 22. Specifically, each of the arms 118 and 120 includes a v-shaped plate 122, that is symmetrical about its vertex, and a cylindrical tubular receptacle 124 extending at a right angle to and having an end welded to the plate at the vertex. The receptacle 124 of the right-hand bell crank 118 is received on and adapted for rocking about the outward end of the right-hand section 110 of the brace 22 while the receptacle 124 of the left-hand bell crank 120 is similarly received on the outward end of the left-hand section 112 of the brace 22. As can be seen in FIGS. 1 and 3, the bell cranks 118 and 120 are oriented such that respective first arms 126 thereof extend rearwardly and have an upwardly opening hook 128 formed in the end thereof and receiving an upper link of the adjacent one of the suspension chains 108. The bell cranks 118 and 120 have respective second legs 130 that project upwardly and have a rearwardly opening hook 132 formed therein and respectively pinned, as at 134 and 136, to rear ends of right- and left-hand lift cranks 138 and 140. The lift cranks 138 and 140 are rotatably supported in an angled plate 142 forming part of the front brace 20. Due to the disposition of the lift cranks 138 and 140 and the length dimension of the receptacles 124 of the bell cranks 118 and 120, the bell cranks are normally kept from falling off the opposite ends of the intermediate brace 22 and, thus do not require any further structure for their retention. However, to ensure that the bell cranks 118 and 120 will positively remain in place on the opposite ends of the brace 22, a substantially semi-circular disk 144 is welded inside each of the opposite ends of the brace 22, with each disk being provided with a notch 146 in its upper side. A carriage bolt 148 is positioned in the notch 146 with its head located inwardly of the disk 144. A jam nut 150 is threaded onto the bolt 148 so that the disk 144 is sandwiched between the bolt head and the jam nut. The v-shaped plate 122 of each of the bell cranks 118 and 120 is provided with a hole 152 that is axially aligned with the associated receptacle 124 and the threaded outer end of the associated carriage bolt 148 projects through the hole and has a washer 154 and lock nut 156 received thereon. The lock nut 156 is not tightened to the extent that the bell cranks 118 and 120 are prevented from turning freely about the brace 22. Thus, it will be appreciated that operation of the lift cranks 138 and 140 will effect rocking of the bell cranks 118 and 120 in one direction or the other depending on the direction of rotation of the bell cranks to thus effect either raising of lowering of the opposite ends of the reel support frame 14. It is here noted that up and down movement of the reel frame or basket 14, during raking operation and within the limitations of the chains 108 is controlled by a stabilizer link 158 having its opposite ends respectively pivotally connected to a rear end location of the left-hand main frame member 18 and a location on the rear basket side 58 adjacent the right-hand hanger bracket 102.

The operation of the rakes 10 and 10' is thought to be understood from the foregoing description in-as-much-as the operation is very similar to that of prior art rakes. However, departing from the prior art is the bent intermediate brace 22 having its end sections 110 and 112 respectively disposed at right angles to the main frame members 16 and 18 so as to be useable in the right-hand rake 10'. Also departing from the prior art is the identical, symmetrical structure of the bell cranks 118 and 122 which permits them to be mounted on either end of the intermediate brace 22. A further departure from the prior art is the front support assembly which includes the identical side plates 28 and 30 and gusset 31 which are parts that are interchangeable and common to both right- and left-hand rakes. Thus, these components which are interchangeable and/or useable with either right- or left-hand rakes result in an overall decrease in the cost of manufacturing a rake.

We claim:

1. In a side-delivery rake including a fore-and-aft extending main frame arched from front to rear and comprising right- and left-hand, rearwardly diverging frame members having forward ends joined together by a front support assembly and being further joined together by front, intermediate and rear braces, a subframe including a rake reel support basket extending beneath said main frame and being disposed diagonally relative to a direction of travel of the rake, right- and left-hand bell cranks pivotally mounted to the main frame, and right- and left-hand connecting members respectively connected between first arms of the right- and left-hand bell cranks and right- and left- hand locations of said subframe, and right- and left-hand lift cranks connected between the main frame and second arms of the right- and left-hand bell cranks whereby rocking of said right- and left-hand bell cranks will respectively effect raising and lowering of right-and left-hand ends of said basket, and a front suspension assembly coupled between the main frame and said basket by a vertical adjustment means for effecting changes in pitch of rake teeth carried by tooth bars of a rake reel mounted to the basket, the improvement comprising: said intermediate brace having right- and left-hand ends respectively defining pivot surfaces for said right- and left-hand bell cranks; and said right- and left-hand bell cranks respectively being mounted for rocking about said pivot surfaces.

2. The side-delivery rake defined in claim 1 wherein said right- and left-hand bell cranks are identical.

3. The side-delivery rake defined in claim 1 wherein said intermediate brace is cylindrical; and said right- and left-hand bell cranks each including a cylindrical, tubular receptacle received on a respective end of the intermediate brace.

4. The side-delivery rake defined in claim 3 wherein said right- and left-hand bell cranks are identical.

5. The side-delivery rake defined in claim 3 and further including retention means for preventing the right- and left-hand bell cranks from moving axially relative to the opposite ends of said intermediate brace while permitting unrestrained rocking of the bell cranks about said opposite ends of said intermediate brace.

6. The side-delivery rake defined in claim 2 wherein said right- and left-hand bell cranks are symmetrical about a central axis whereby they are interchangeable 7. The side delivery rake defined in claim 1 wherein said intermediate brace is bent so as to have right- and left-hand end sections respectively disposed at right angles to and projecting outwardly through said right- and left-hand frame members, whereby said brace may be embodied in a different rake having a main frame and basket arranged for delivering crop to an opposite side of the rake from the direction of delivery of crop of the first mentioned rake.

8. The side-delivery rake defined in claim 1 wherein said right- and left-hand frame members have arcuately curved forward ends; and said front support assembly including a pair of identical, arcuate side plates shaped complementary to and respectively releasably secured to said right- and left-hand frame members.

9. The side-delivery rake defined in claim 1 wherein said right- and left-hand lift cranks are rotatably supported in said front brace.

* * * * *